United States Patent [19]

Fuderer

[11] Patent Number: 4,592,860

[45] Date of Patent: Jun. 3, 1986

[54] PROCESS AND APPARATUS FOR AMMONIA SYNTHESIS GAS PRODUCTION

[75] Inventor: Andrija Fuderer, Antwerp, Belgium

[73] Assignee: Union Carbide Corporation, Danbury, Conn.

[21] Appl. No.: 577,836

[22] Filed: Feb. 7, 1984

[51] Int. Cl.$^4$ ................................. C01B 3/26
[52] U.S. Cl. .................................... 252/376
[58] Field of Search .................. 252/373, 376, 375

[56] References Cited

U.S. PATENT DOCUMENTS

| 4,296,085 | 10/1981 | Banquy | 252/376 |
| 4,337,170 | 6/1982 | Fuderer | 48/197 R |
| 4,375,363 | 3/1983 | Fuderer | 55/25 |
| 4,414,191 | 11/1983 | Fuderer | 423/359 |

FOREIGN PATENT DOCUMENTS

| 49967 | 4/1982 | European Pat. Off. |
| 106076 | 4/1984 | European Pat. Off. |
| 126961 | 12/1984 | European Pat. Off. |
| 1579549 | 11/1980 | United Kingdom |
| 2048840 | 12/1980 | United Kingdom |
| 2121775 | 1/1984 | United Kingdom |
| 2126573 | 3/1984 | United Kingdom |

OTHER PUBLICATIONS

Stewart et al., "Pressure Swing Adsorption," *Chemical Engineering Progress*, vol. 65, No. 9, Sep. 1969.

Primary Examiner—Natalie Trousof
Assistant Examiner—Bruce D. Gray
Attorney, Agent, or Firm—N. L. Balmer

[57] ABSTRACT

A fluid hydrocarbon feed stream is converted with excess air to a mixture of hydrogen and carbon monoxide, also containing the nitrogen content of said air. Following high temperature shift conversion to convert said carbon monoxide to hydrogen and carbon dioxide, the gas mixture is passed to a pressure saving adsorption system used to produce an impure ammonia synthesis gas mixture of hydrogen and nitrogen, with excess nitrogen being separated and removed therefrom with the impurities discharged from the system at high operating pressures, the purge gas effluent from the pressure swing adsorption system can be passed to an expansion turbine for desirable power energy. The ammonia synthesis gas, which can be passed to a methanator for final purification, is thus produced without the need for employing an air separation plant or a nitrogen plant.

13 Claims, No Drawings

PROCESS AND APPARATUS FOR AMMONIA SYNTHESIS GAS PRODUCTION

BACKGROUND OF THE INVENTION

1. Field of the Invention

The invention relates to the production of ammonia synthesis gas. More particularly, it relates to an improved process and apparatus, incorporating pressure swing adsorption technology, for producing such ammonia synthesis gas.

2 Description of the Prior Art

Ammonia synthesis gas production is conventionally based on the steam reforming of natural gas or naphtha, followed by secondary reforming with air. Because of the dramatic increase in energy costs in recent years, efforts have been made to achieve processing and energy savings in such operations. The potential for process simplification by the use of pressure swing adsorption (PSA) technology for hydrogen purification has been recognized in the art. This has particular commercial significance since ammonia production represents the largest hydrogen consumer of all chemical processing industry. In contrast to other approaches, including combinations of wash systems, methanation and the like, the PSA approach enables the essentially complete removal of all contaminants and inerts from the hydrogen-containing gas in a single purification.

While the steam reforming of natural gas or naphtha is generally preferred for feedstock conversion in ammonia production, it is also possible to subject feedstocks to partial oxidation conversion, and there has been some trend toward basing commercial plants on the use of oxygen for the partial oxidation of heavier petroleum fractions and coal. In ammonia production operations based either on steam reforming or on partial oxidation operations, an air separation system, or a nitrogen plant, has been incorporated as a necessary element of the overall system. Thus, the oxygen from such a system has been employed for the partial oxidation of hydrocarbon feedstocks. The nitrogen recovered from such a system has been mixed with the purified hydrogen discharged from the PSA system to form the desired ammonia synthesis gas.

While the use of PSA technology in the production of ammonia synthesis gas has been found advantageous, there is a continuing need in the art for the development of improvements to offset the high cost of energy. One response to this need has been the proposed use of external source nitrogen as a purge gas in the purification of hydrogen by pressure swing adsorption techniques for use in ammonia production operations. By such means, nitrogen is conveniently recovered from the PSA system, together with purified hydrogen, at the higher adsorption pressure employed in the PSA system. By employing the nitrogen at an elevated pressure as such purge gas, the purge gas effluent removed from the PSA system can be used for desirable power generation purposes. The power thus generated can be used to compress air passing to an air separation or nitrogen plant, with the nitrogen recovered therefrom being available for convenient use as the elevated pressure, external source nitrogen purge gas for the PSA system. The recovered oxygen can be used in a secondary reforming unit, if employed, or in a partial oxidation unit, if so employed, for the generation of hydrogen. This approach will be seen, therefore, to enable a highly desirable, overall integration to be achieved with respect to the hydrogen generation, PSA-hydrogen purification, ammonia systhesis and air separation portions of the overall system for converting hydrocarbon feedstocks into ammonia synthesis gas. Such integration enables ammonia synthesis gas and product ammonia to be produced at lower energy costs than is possible using other technologies presently available in the art. The use of elevated pressure nitrogen purge gas also enables the design of the PSA system to be simplified as a result of the lower pressure drop pertaining across the adsorbent beds employed therein. Despite such highly desired benefits, there remains in the art a desire and need for further improvements and enhancement of the overall system and process for the production of ammonia synthesis gas by means of pressure swing adsorption technology. Indeed, such continuing improvements are necessary if ammonia synthesis gas and ammonia are to be available to economical costs, despite the high cost of energy, so as to satisfy the growing requirements of industrial societies throughout the world.

It is an object of the invention, therefore, to provide an improved process and apparatus for the production of ammonia synthesis gas.

It is another object of the invention to provide a process and apparatus for enhancing the use of pressure swing adsorption technology in the production of ammonia synthesis gas.

It is a further object to provide a process and apparatus capable of reducing the costs associated with the overall system for converting hydrocarbon feedstocks to desired ammonia synthesis gas.

With these and other objects in mind, the invention is hereinafter described in detail, the novel features thereof being particularly pointed out in the appended claims.

SUMMARY OF THE INVENTION

Air is employed, in secondary reforming or partial oxidation operations, such that the resulting gas mixture passed to a downstream PSA system contains an appreciable quantity of nitrogen. A portion of this nitrogen is recovered for the PSA system, together with hydrogen, as a partially purified ammonia synthesis gas. The excess nitrogen is discharged with the waste gas from the system. Upon carrying out the purge operation at an elevated pressure, a purge gas effluent, including the excess nitrogen, is available for power generation purposes. The presence of such excess nitrogen in the PSA system enables high hydrogen recovery to be achieved, and the need for employing an air separation unit, or a nitrogen plant, is avoided.

DETAILED DESCRIPTION OF THE INVENTION

In the practice of the invention, air is employed in the hydrocarbon feedstock conversion operation under conditions such that a considerable amount of nitrogen is present in the resulting gas mixture. Following shift conversion, this gas mixture containing such nitrogen is passed to a PSA system, wherein advantageous use is made of the nitrogen so as to obviate the need for an air separation operation and to achieve other benefits enhancing the overall ammonia synthesis gas production operation. The PSA system rejects excess nitrogen and other impurities, while enabling a partially purified hydrogen-nitrogen mixture to be recovered as a desired ammonia synthesis gas stream.

The process and apparatus of the invention involve the use of several well-known, previously employed operations carried out in a unique manner as set forth herein, enhancing the overall operation and enabling significant processing simplifications to be achieved as compared with conventional practice. Thus, the invention utilizes a hydrogen generation step in which a hydrocarbon feed stream is converted to hydrogen and carbon monoxide, a water gas shift conversion step, and a pressure swing adsorption step in which a hydrogen-nitrogen gas is obtained as a partially purified ammonia synthesis gas, and a nitrogen-containing purge effluent stream is available for power generation purposes. In the hydrogen generation step, a hydrocarbon feed stream such as natural gas or naphtha, is conveniently subjected to primary and secondary reforming operations. In such embodiments, the hydrocarbon feed stream is catalytically reacted with steam in a primary reforming unit to fornm a primary reformed gas mixture containing hydrogen and carbon monoxide. Primary reforming is carried out in a conventional manner in the catalyst-filled reformer tubes of a primary reformer unit heated typically by the burning of a fuel with air in the reformer unit external to said reformer tubes positioned therein. The primary reformed gas mixture is typically obtained at a temperature of from about 800° C. to about 900° C. It is within the scope of the invention to employ any conditions ordinarily employed in primary steam reforming operations to promote the desired conversion of the hydrocarbon feed stream to hydrogen and carbon monoxide.

Those skilled in the art will appreciate that hot primary reformed gas is often passed to a secondary reformer unit in which said primary reformed gas passes, together with oxygen or air, through a bed of the reforming catalyst. The oxygen or air reacts with unconverted methane present in the primary reformed gas mixture, thereby forming a secondary reformed gas mixture. This gas mixture is generally cooled in a waste heat recovery zone prior to further processing. In this regard, it should be noted that the partial combustion reaction occurring in the secondary reforming unit tends to increase the temperature of the gas mxiture so that the hot effluent from the secondary reforming unit will commonly be at a temperature of from about 900° C. to about 1200° C.

In the practice of the invention, the primary reformed gas mixture is passed to a secondary reformer unit, as in conventional practice, for contact with air therein. Contary to conventional practice, however, the amount of air introduced to said unit is considerably in excess of that required to furnish the stoichiometric amount of oxygen required for reaction with unconverted methane present in the primary reformed gas mixture. As indicated above, the large amount of nitrogen thus introduced into the gas mixture being treated passes with said gas mixture to the pressure swing adsorption system wherein it is advantageously employed for purposes of the desired ammonia synthesis gas production. While the amount of excess air thus passed to the secondary reformer unit may vary depending upon the hydrocarbon feed stream employed and the overall conditions and requirements pertinent to a given ammonia production operation, the amount of air employed, for purposes of the invention, is preferably such that the gas mixture, following water gas shift conversion, has a hydrogen/nitrogen molar ratio of between about 1/1 and about 2.4/1 as contrasted to the stoichiometric ratio of 3/1 for ammonia synthesis gas.

As in conventional practice, the secondary reformed gas mixture of the invention is subjected to water gas shift conversion to convert carbon monixide present in the reformed gas mixture to hydrogen and carbon dioxide. Thus, the secondary reformed gas mixture is typically cooled to a temperature generally on the order of about 300°-400° C. and is then passed to conventional water gas shift conversion means. Those skilled in the art will appreciate that reformed gas mixtures are commonly subjected to high temperature shift carried out in the presence of known, commercially available chromium-based water gas shift catalysts at said indicated temperature level. Low temperature shift is also known in the art and is generally carried out at a temperature level on the order of about 250°0 C. in the presence of known, commercially available copper-based water gas shift catalysts. While the carrying out of low temperature shift conversion upon completion of high temperature shift to achieve more complete shift conversion, as is necessary in some commercial processes, may be carried out within the scope of the invention, it should be noted that only said high temperature shift is generally required in the practice of the invention. In preferred embodiments of the invention, therefore, shift conversion consists of high temperature shift only, without resort to subsequent low temperature shift conversion. It will be appreciated that this is an advantageous feature of the invention since the copper-based low temperature shift catalyst is more expensive and is more delicate or sensitive in use than the chromium-based catalyst employed for high temperature shift conversion. In any event, most of the carbon monoxide present in the secondary reformed gas mixture, e.g., more than 80%, typically from about 85% to 98%, of the CO content of said gas mixture will generally be converted in the practice of the invention.

In conventional practice, it is customary to pass the shifted gas mixture to a carbon dioxide scrubbing zone for removal of a major portion of the carbon dioxide content thereof, down to a residual $CO_2$ content of 0.1% or less, prior to passage of the shifted gas mixture to a methanation reaction zone for removal of carbon oxides to lower levels. The incorporation of such a carbon dioxide removal step is not required in the practice of the invention, resulting in a further simplification of the process and apparatus as herein described and claimed. The carbon dioxide content of the shifted gas mixture, reduced in concentration because of the presence of a large quantity of nitrogen therein, is conveniently separated from the desired hydrogen-nitrogen ammonia synthesis gas in the PSA system, being removed therefrom during countercurrent depressurization and purge along with excess nitrogen, and residual amounts of carbon monoxide, methane, hydrogen and the like.

The gas mixture being treated is passed, following water gas shift conversion, to a pressure swing adsorption system capable of selectively adsorbing carbon dioxide, carbon monoxide, methane and other impurities from hydrogen and from a portion of the nitrogen present in said gas mixture and recovered in the hydrogen-nitrogen ammonia synthesis gas withdrawn from said PSA system as the desired product thereof. Said product is recovered as a less readily adsorbable component of the feed gas to the PSA system, with said impurities referred to above being separated therefrom as the more readily adsorbable component of said fed gas. The PSA processing cycle, carried out in sequence in each adsorbent bed employed in the PSA system, comprises (i) higher pressure adsorption in which the shifted gas mixture is introduced to the inlet end of the bed, with adsorption of impurities therefrom, and discharge of a partially purified ammonia synthesis gas mixture of hydrogen and nitrogen from the discharge end thereof; (ii) partial cocurrent depressurization of the bed with release of hydrogen-containing void space gas from the discharge end of the bed; (iii) countercurrent depressurization of the bed with release of gas from the inlet end thereof, thereby depressurizing the bed to its lower desorption pressure; (iv) introduction of purge gas to the discharge end of the bed, preferably at its lower desorption pressure level, with discharge of purge gas effluent from the inlet end of the bed; (v) repressurization of the purged bed to said adsorption pressure level usually with feed gas or product gas; and (vi) repetition of said cyclic steps (i)-(v) with additional quantities of the shift gas mixture being passed to the bed during said higher pressure adsorption step (i). Those skilled in the art will appreciate that various processing and apparatus features may be incorporated into the PSA process and apparatus as employed in various embodiments without departing from the scope of the invention. Thus, the pressure swing adsorption portion of the invention will typically be carried out in multi-bed systems, with at least four adsorbent beds being commonly employed although systems having a lesser number of beds can also be employed in the practice of the invention. It will be appreciated that, in multi-bed systems, the void space gas released from the discharge end of one bed during cocurrent depressurization thereof is conveniently passed to another bed or beds in the system for pressure equalization and/or provide purge purposes.

As indicated above, essentially all carbon dioxide, most of the methane, most of the carbon monoxide and the excess nitrogen present in the shifted gas mixture introduced with the PSA system are separated from the partially purified product gas stream thereof, which advantageously contains about 75% hydrogen and about 25% nitrogen, together with residual amounts of other components such as, typically, about 0.4-0.5% argon, between 0.005 and 0.3% carbon monixide and less then 100 ppm of carbon dioxide. The latter components may be removed from said product gas in a subsequent methanation step. Thus, the partially purified ammonia synthesis gas mixture is passed, if so desired, to a conventional methanator unit for optional conversion of residual amounts of carbon monoxide and carbon dioxide contained therein to methane. As will be readily appreciated by those skilled in the art, the conventional methanation step is essentially the reverse of the primary steam reforming step, but carried out at lower temperature, wherein CO and $CO_2$ are caused to react with hydrogen to form methane and water.

The invention will be seen to obviate the need for employing an air separation unit or nitrogen plant as employed in conventional practice to supply oxygen for secondary reforming or for partial oxidation and/or to supply external source nitrogen for purge and/or repressurization purposes or for admixture with a purified hydrogen product stream discharge from a PSA system in conventional practice. In addition to this very important advantage and the other benefits of the invention as herein disclosed, high hydrogen recoveries of from about 88% to about 96% can be achieved in the PSA system. Those skilled in the art will appreciate that, during the higher pressure adsorption step in each bed, the presence of large quantities of nitrogen in the bed enables nitrogen to be recovered therefrom together with unadsorbed hydrogen, thereby forming an ammonia synthesis gas mixture, and that excess nitrogen will be adsorbed by the adsorbent. During the cocurrent depressurization step, desorbed nitrogen displaces most of the hydrogen contained in the void spaces from the bed. The nitrogen peak in the bed, rolled up by the trailing adsorbed carbon dioxide front, is then pushed out of the bed. This nitrogen is used to provide purge gas so that the purging of other beds in the system consequently is accomplished with a purge gas that typically contains 50-90% nitrogen. Since the bed is thus purged essentially with the excess nitrogen present in the shifted gas mixture fed to the PSA system, desirably high hydrogen recoveries are obtained in the practice of the invention, although only about 50-70% of the nitrogen present in said shifted gas mixture is recovered.

The invention will be seen, in the embodiments referred to above, to involve the use of a primary reformer, a secondary reformer, a shift converter, a PSA system and commonly a methanator, wherein the secondary reformer is operated with excess air such that excess nitrogen for subsequent ammonia synthesis is introduced into the system and is rejected in the PSA system. In a significant modification of the invention, a portion of the fluid hydrocarbon feed stream passing to the primary reforming unit can be diverted for passage directly to the secondary reforming unit. This enables a significant reduction in the steam requirements for the tubular section of the primary reformer, although the steam to carbon ratio in said tubular section remains the same. While it will be appreciated that the amount of feed gas caused to by-pass the primary reformer unit will vary widely depending on the circumstances pertaining to any given application, more than 50% of the overall feed conversion can advantageously occur in the secondary reformer. The secondary reformed gas mixture is commonly passed to a heat exchanger for the recovery of heat from said gas mixture prior to subjecting it to shift conversion at the temperature level indicated above. It is also advantageous to pass the secondary reformed gas mixture to a water quench zone, wherein quench water can be used to reduce the temperature thereof to an intermediate level, e.g., about 750° C. or lower, prior to recovery of heat therefrom in a heat exchanger. This will be understood to permit a less expensive heat exchanger, or other heat recovery system, to be used. This is an important operational consideration, particularly in the operation of relatively small size plants.

In the practice of the invention, with or without diversion of a portion of the feed gas to the secondary reformer, the primary reformer can be kept quite small and can be operated under very mild conditions. It is further within the scope of the invention to delete the primary reformer completely and to subject the hydrocarbon feed stream to partial oxidation with excess air to form an effluent gas stream containing hydrogen and carbon monoxide. As in the embodiments discussed above, the amount of air employed for said partial oxidation is in excess of that required to furnish the stoichiometric amount of oxygen for said partial oxidation and is such as to provide excess nitrogen for the subsequent ammonia synthesis. It will be understood that the effluent gas stream will contain said excess nitrogen present in the air used for said partial oxidation of the hydrocarbon feed stream. The gas mixture passed to the pressure swing adsorption system, following shift conversion, will thus contain excess nitrogen typically such that the hydrogen/nitrogen molar ratio is between about 1/1 and 2.4/1, although it will be appreciated that quantities of nitrogen falling outside this range can also be processed in accordance with the invention. It should be noted that partial oxidation processing is commonly employed in the treatment of residual oil and coal, whereas as heretofore noted steam reforming is commonly employed for natural gas and light hydrocarbon conversion.

The process of the invention is advantageously carried out under elevated pressure conditions. It will be appreciated that steam reforming operations, including those of the invention, are commonly carried out at superatmospheric pressure. The specific operating pressure is influenced by the pressure requirements of the subsequent processing steps, but is commonly from about 350 to about 700 psia, although higher pressures up to 1,000 psia or more can be maintained in particular embodiments. For purposes of the invention, it is generally preferred to pass the large quantities of air used for secondary reforming to said secondary reforming unit at a pressure of from about 500 to 1000 psia, particularly from about 700 to about 900 psia. Subsequent operations are desirably carried out such that the purge gas effluent discharged from the inlet end of each absorbent bed of the PSA system is at an elevated desorption pressure level is contrasted to operations in which the lower desorption pressure is about atmospheric pressure. Thus, the purge gas effluent is discharged from the inlet end of each bed at a pressure of from about 60 to about 100 psia, typically at from about 70 to about 90 psia, in preferred embodiments of the invention. The purge gas available at such pressure levels can advantageously be used for power generation purposes, particularly in light of the presence of said excess nitrogen, as well as carbon dioxide, in the purge gas effluent. Accordingly, said purge gas effluent is desirably expanded in an expansion turbine or like meanss for generating power, thereby further enhancing the overall ammonia synthesis process. For such purposes, the purge gas effluent is conveniently expanded to about atmospheric pressure. It is also within the scope of the invention to pass the expanded purge gas to the primary reforming unit, when employed, for use as fuel therein, although the purge gas may contain such small quantities of burnable components that it is more appropriately flared.

Any suitable adsorbent material having a desirable selectivity for purposes of the invention can be used in the practice thereof. Suitable adsorbents include zeolitic molecular sieves, activated carbon, silica gel, activated alumina and the like. Zeolitic molecular sieve adsorbents are generally desirable for purposes of the invention. Information concerning such zeolitic molecular sieves is contained in the Kiyonaga patent, U.S. Pat. No. 3,176,444 and various other patents relating to the PSA process and system as employed for various applications.

In the practice of the invention, it will be understood that the PSA system employed will necessarily incorporate various conduits, valves and other control features to accomplish the switching of the adsorbent beds from one processing step to the next in appropriate sequence. Similarly, conduit means are provided for discharging ammonia synthesis gas and purge gas effluent and countercurrent depressurization, i.e., blowdown, from the system, as well as for passing gas to each bed, and from one bed to another, directly or through intermediate storage vessels, in various well-known embodiments of the PSA processing cycle and system. It should be noted that, when the hydrocarbon conversion means consists essentially of a primary reforming unit and a secondary reforming unit, it is particularly advantageous to employ such hydrocarbon conversion means in the form of an integrated primary-secondary reforming unit. In such a unit, the secondary reformed gas mixture supplies the endothermic heat of reaction required for the primary reforming of the hydrocarbon feed stream. Essentially autothermal operating conditions are thereby achieved, essentially eliminating the necessity for employing an external fuel fired primary reformer and/or for consuming a portion of the hydrocarbon feed material for fuel purposes.

The invention is utilized to advantage in an illustrative example of the conversion of natural gas to an ammonia synthesis gas in which excess air is employed for second reforming so that the secondary reformed gas mixture passed to high temperature shift conversion has a hydrogen/nitrogen molar ratio of about 2/1 at a pressure of about 750 psia. The shift gas mixture passed to the PSA system has a carbon doxide content of 15%, a nitrogen content of 30% and a CO content of 1%. The purge effluent from the PSA system contains carbon dioxide, methane, carbon monoxide, excess nitrogen and hydrogen at a pressure of 70 psia. This effluent stream is preheated and/or combusted with air and is passed to a turbine expander for power recovery purposes as in prior art PSA technology in which external source nitrogen is used as a purge gas. The partially purified hydrogen-nitrogen ammonia synthesis gas mixture recovered from the PSA system contains essentially 75% hydrogen and 25% nitrogen, together with about 1,000 ppm (parts per million) CO, less than 5 ppm $CO_2$, 100 ppm methane about 0.3% argon. Upon methanation, the ammonia synthesis gas is obtained as a wet syngas containing 0.2% methane. After compression to 1500 psia or higher, most of the syngas is converted to ammonia product. To avoid excessive build-up of argon and methane in the synthesis loop, some of the gas purged from the loop may be recycled to the PSA system as a second feed.

The elimination of the air separation unit, or nitrogen plant, heretofore incorporated in conventional systems for converting hydrocarbon fuel streams to ammonia, represents a significant development in the art. As disclosed above, the presence of large quantities of nitrogen in the gas mixture being heated, as a result of the use of much more air than is required for secondary reforming, or of the similar use of excess air for partial oxidation, represents an advantage, rather than a disadvantage, when utilized as herein disclosed and claimed in conjunction with pressure swing adsorption technology. Thus, the nitrogen is utilized to form the desired hydrogen-nitrogen synthesis gas mixture recovered at higher adsorption pressure, and excess nitrogen present in the PSA system serves to enhance hydrogen recovery from the system and to enable power recovery from the waste purge gas to be enhanced.

While processes operating with excess air and thus resulting in higher than stoichiometric nitrogen/hydrogen ratios are well known in the art, the excess nitrogen thereby present is removed by cryogenic techniques in these processes. This necessarily requires the preceding removal of carbon dioxide from the gas stream and the prepurification of the thus-treated gas stream to remove traces of carbon dioxide and water therefrom prior to application of said cryogenic techniques. By contrast in the practice of the invention, the PSA purification system accomplishes the carbon dioxide removal and excess nitrogen removal, as well as the removal of most other impurities, in a single processing step.

Of even greater significance, the unusually high purge pressure employed in the PSA processing operations, whereby all of the rejected $CO_2$, CO, methane and nitrogen can be obtained at pressures on the order of about 80 psia, enables the generation of a very significant amount of power upon combustion and expansion in hot gas expanders. In a 1,000 metric ton per day ammonia plant, for example, such a hot gas expander produces 12,000 kw of power. The process and apparatus herein disclosed and claimed thus represents an advance in the art that facilitates the enhanced production of ammonia in a practical, commercially feasible manner as desired in the art.

I claim:

1. An improved process for the production of ammonia synthesis gas comprising:
   (a) catalytically reacting a hydrocarbon feed stream with steam in a primary reforming unit to form a primary reformed gas mixture containing hydrogen and carbon monoxide;
   (b) passng said primary reformed gas mixture to a secondary reforming unit for reaction of unconverted methane present therein with air, the amount of said air introduced to said secondary reforming unit being considerably in excess of that required to furnish the stoichiometric amount of nitrogen required for reaction with hydrogen for said ammonia synthesis;
   (c) subjecting said secondary reformed gas mixture to water gas shift conversion to convert most of the carbon monoxide present in said reformed gas mixture to hydrogen and carbon dioxide;
   (d) passing the thus-shifted gas mixture containing hydrogen, carbon dioxide, residual carbon monoxide, methane, argon and said excess nitrogen, without necessary treatment for removal of a major portion of the carbon dioxide content thereof and without methanation to remove carbon oxides to low levels, to a pressure swing adsorption system capable of selectively adsorbing carbon dioxide, carbon monoxide, methane and other impurities from said hydrogen and from a portion of said nitrogen present in the gas passed to said system, the processing cycle in the pressure swing adsorption system comprising:
      (i) introduction of the thus-shifted gas mixture to the inlet end of an adsorbent bed at an adsorption pressure level, with adsorption of impurities therefrom and discharge of a partially purified ammonia synthesis gas mixture of hydrogen and nitrogen from the discharge end thereof, excess nitrogen being adsorbed in the adsorbent bed;
      (ii) partial cocurrent depressurization of the adsorbent bed with release of hydrogen-containing void space gas from the discharge end of the bed upon being displaced by desorbed nitrogen, the nitrogen peak in the bed, being rolled up by the trailing adsorbed carbon dioxide front, then being pushed out of the discharge end of the bed, said nitrogen being used to provide purge gas to another adsorbent bed in the system;
      (iii) countercurrent depressurization of the bed with release of gas from the inlet end thereof, thereby depressurizing the bed to its lower desorption pressure;
      (iv) introduction of purge gas comprising desorbed nitrogen to the discharge end of the bed at its lower desorption pressure level, with discharge of purge gas effluent from the inlet end of the bed;
      (v) repressurization of the purged bed to said adsorption pressure level; and
      (vi) repetition of said cyclic steps (i)–(v) with additional quantities of the thus-shifted gas mixture, whereby excess nitrogen present in the reformed gas mixture being treated is conveniently used in the pressure swing adsorption system as purge gas and high hydrogen recoveries can be obtained, and the desired ammonia synthesis gas is produced without a requirement for employing an air separation or nitrogen plant to provide the nitrogen content of said ammonia synthesis gas.

2. the process of claim 1 in which the purge gas effluent discharged from the inlet end of the bed is at a pressure of from about 60 to about 100 psia.

3. The process of claim 2 and including expanding said purge gas effluent discharged from the inlet end of the bed in an expansion turbine, thereby generating power and further enhancing the overall ammonia synthesis process.

4. The process of claim 3 in which said purge gas effluent is preheated and/or combusted with air and is expanded to about atmospheric pressure.

5. The process of claim 4 in which said purge gas effluent discharged from the inlet end of the bed is at a pressure of from about 70 to about 80 psia.

6. The process of claim 4 and including passing said expanded purge gas to said primary reforming unit for use as fuel therein.

7. The process of claim 4 in which said thus-shifted gas mixture passed to the pressure swing adsorption system contains excess nitrogen such that the hydrogen-nitrogen molar ratio thereof is between about 1/1 and about 2.4/1. and shift conversion consisting of high temperature shift only.

8. The process of claim 7 in which the ammonia synthesis gas mixture discharged from the pressure swing adsorption system contains essentially 75% hydrogen and 25% nitrogen, together with minor amounts of carbon monoxide, methane and argon.

9. The process of claim 1 in which the air passed to said secondary reforming unit is at a pressure of from about 500 to about 1000 psia.

10. The process of claim 9 in which said pressure is from about 700 to about 900 psia.

11. The process of claim 1 and including diverting a portion of the fluid hydrocarbon feed stream passing to the primary reforming unit for passage directly to said secondary reforming unit, thereby achieving a significant reduction in the steam requirements for said primary reforming unit.

12. The process of claim 11 and including recovering heat from the secondary reformed gas mixture prior to subjecting said mixture to shift conversion.

13. The process of claim 12 and including water quenching said secondary reformed gas mixture for temperature reduction thereof prior to said recovery of heat from said gas mixture.

* * * * *